Oct. 13, 1953    M. FUNKHOUSER ET AL    2,655,233
SHOCK ABSORBER
Filed June 29, 1951    2 Sheets-Sheet 1

INVENTORS
MEARICK FUNKHOUSER &
BY GEORGE A. BRUNDRETT

THEIR ATTORNEYS

Oct. 13, 1953 — M. FUNKHOUSER ET AL — 2,655,233
SHOCK ABSORBER
Filed June 29, 1951 — 2 Sheets-Sheet 2

INVENTORS
MEARICK FUNKHOUSER &
BY GEORGE A. BRUNDRETT

THEIR ATTORNEYS

UNITED STATES PATENT OFFICE 2,655,233

SHOCK ABSORBER

Mearick Funkhouser and George A. Brundrett, Dayton, Ohio, assignors to General Motors Corporation, Detroit, Mich., a corporation of Delaware Application June 29, 1951, Serial No. 234,203

12 Claims. (Cl. 188—88)

This invention relates to improvements in fluid flow control mechanism particularly adapted for hydraulic shock absorbers.

It is among the objects of the present invention to provide an hydraulic shock absorber with control mechanism by means of which fluid flow is predeterminedly restricted so that the shock absorber will provide the proper resistance to relative movements of the vehicle parts between which it is connected, thereby producing the desired riding qualities while the vehicle is being operated either over comparatively smooth or irregular road surfaces.

Further objects and advantages of the present invention will be apparent from the following description, reference being had to the accompanying drawings wherein a preferred embodiment of the present invention is clearly shown.

Figure 1:
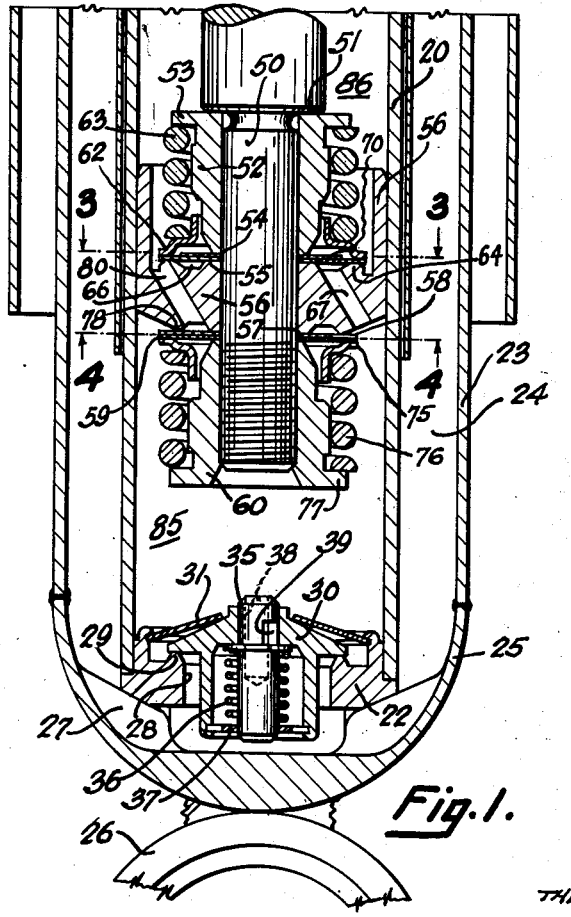
Fig. 1 is a longitudinal sectional view of a direct acting type, hydraulic shock absorber equipped with control mechanism constructed in accordance with the present invention.
Figure 2:
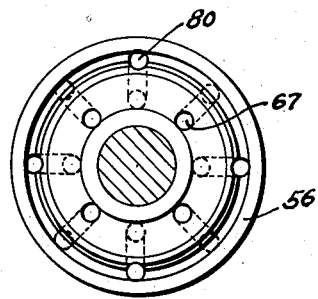
Fig. 2 is a top plan view of the piston.
Figure 3:
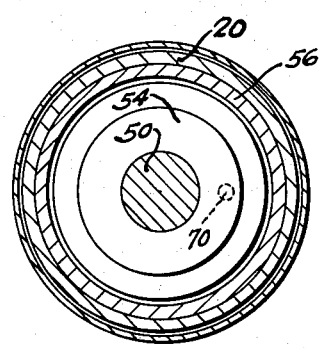
Fig. 3 is a transverse sectional view taken along the line and in the direction of the arrows 3—3 in Fig. 1.
Figure 4:
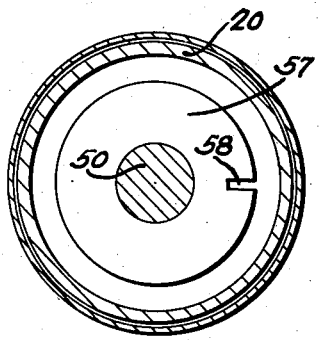
Fig. 4 is a sectional view taken along the line and in the direction of the arrows 4—4 of Fig. 1.

The shock absorber equipped with fluid flow mechanism of the present invention comprises a working cylinder 20 provided with a closure member 21 at one end and a closure member 22 at the opposite end. A tubular member 23 surrounds the work cylinder 20 and provides an annular space which forms the fluid containing reservoir 24. Tubular member 23 is secured at one end to an end cap 25 by welding said end cap having a mounting ring 26 attached thereto in any suitable manner. Interior ribs 27 within the end cap 25 form a base upon which the end closure 22 of work cylinder 20 rests.

The end closure member 22 which is secured to one end of the working cylinder 20 has a central opening 28 the end of which, opening into the cylinder 20, having an annular ridge 29 surrounding it which forms a seat for the intake valve 30. This intake valve is yieldably urged upon its seat by spring fingers 31 extending radially from a ring secured to the end closure member or what might be termed the valve cage by the spinning over of its inner edge. This intake valve has a central opening of two diameter portions, the smaller of which slidably carries the pressure relief valve 35 provided with an annular flange which is urged yieldably to engage the intake valve by a spring 36 interposed between said annular flange and an abutment collar or washer 37 secured within the larger diameter opening in the intake valve. This pressure relief valve has its inner end recessed as at 38 and a side opening 39 in the annular wall of this recessed portion of the relief valve is normally within the confines of the smaller diameter opening of the intake valve. This valve mechanism controls the transfer of fluid between the reservoir and the cylinder in both directions. The intake valve is adapted to be lifted from its seat against the effect of said spring fingers yieldably urging it upon the seat in order to permit a fluid flow from the reservoir through the central opening in the closure member into the cylinder. When necessary, a constantly open orifice may be provided between the valve 30 and its seat 29. This orifice may be a slot in a disc on valve 30 or it may be a notch in the seat 29.

The pressure relief valve, in response to fluid pressure within the cylinder, is adapted to be moved against the effect of the spring yieldably urging said pressure relief valve to engage the intake valve, so that the side opening in the pressure relief valve is shifted out of the confines of the smaller diameter opening in said intake valve, whereby restricted communication is completed between the interior of the cylinder and the fluid reservoir.

The upper closure member 21 of work cylinder 20 is centrally apertured slidably to support the piston rod 40 which extends also through any suitable packing gland 41 confined within a recess in the closure member 21. The outer end surface of the closure member 21 is covered by a cap 32 which fits into the one end of the tube 23 forming the fluid reservoir 24. The inner end of closure member 21 telescopically engages the working cylinder 20 and thus the working cylinder 20 is held concentric of the fluid reservoir 23.

The outer end of the piston rod 40 has a disc 44 secured thereto in any suitable manner, this disc having a tubular member 45 attached thereto which surrounds the reservoir tube 23 for a portion of its length and provides a guard therefor. A mounting ring 46 is secured to the end of the piston rod 40 preferably by welding. Rings 26 and 46 form means for attaching the opposite ends of the shock absorber to the relatively movable members whose movements the shock absorber is adapted to control these members usually being the frame and axle of a vehicle to which a shock absorber is applied.

The piston rod 40, extending through the end closure member 21 into the interior of the cylinder, has a reduced diameter portion 50 providing a shoulder 51. A collar 52 has an outwardly extending flange 53 at the end which engages the shoulder 51 on the piston rod. The opposite end of this collar 52 is engaged by a resilient disc 54 fitting about the piston rod portion 50 and this resilient disc 54 in turn engages the resilient disc valve 55 which also fits about the piston rod portion 50. The centrally apertured piston 56 fits upon the rod portion 50 one end of said piston 56 engaging the disc valve 55 the opposite end of said piston being in turn engaged by a disc valve 57 centrally apertured to fit about the rod portion 50. This disc valve 57 has a notch 58, of predetermined dimensions, providing an orifice adjacent its peripheral edge. Another flexible disc 59 engaging the disc valve 57, acts as a backing element therefor. A nut 60 is threadedly received by the threaded end of the piston rod portion 50, the inner end of this nut engaging the backing disc 59 so that with tightening of the nut 60 the backing disc 59, the disc valve 57 the piston 56, the disc valve 55, the resilient disc 54 and the collar 52 which engages shoulder 51 on rod 40, are all clamped together on the piston rod 40 thus holding all these parts clamped together in assembled relation on said piston rod.

An abutment ring 62 loosely fits upon the collar 52 said abutment ring 62 having an outwardly extending flange which rests upon the resilient disc valve 55 adjacent its peripheral edge and is urged against said valve by a spring 63 interposed between said abutment ring 62 and the annular shoulder 53 on the collar 52. An annular ridge 64 on the side of the piston engaged by valve 55, forms a seat for said valve against which the valve is yieldably urged by the spring 63. An annular groove 66 is provided in the end of the piston inside of the confines of the annular valve seat 64, said groove communicating with passages 67 through the piston, the opposite ends of said pasages 67 terminating in the opposite end of the piston adjacent its outer peripheral edge or more specifically adjacent the cylinder wall. The resilient disc 54 resting upon the disc valve 55 on the same side of the valve engaged by the abutment ring 62 normally closes an orifice 70 of predetermined dimensions provided in the disc valve 55. This orifice opens into the annular groove 66 in the piston. The abutment ring 62 is so shaped that the resilient disc 54 may be flexed to open the orifice 70 in the disc valve 55 without engaging the abutment collar 52. Suitable clearance between the abutment ring 62 and collar 52 provides communication between the orifice 70 and the cylinder portion above the piston 56.

Another abutment ring 75 fits loosely about the nut 60 and is yieldably urged to engage the backing plate 59 by a spring 76 interposed between said abutment ring 75 and annular flange 77 on the nut 60. This spring 76 thus yieldably maintains the disc valve 57 upon an annular seat 78 provided on the side of the piston adjacent thereto. An annular groove formed in this end of the piston is covered by the disc valve 57 and is in communication with passages 80, the corresponding ends of which are open and communicate with the cylinder chamber above the piston 56. The shock absorber so described and illustrated by Figs. 1 to 4 inclusive operates in the following manner.

When the shock absorber is operated so that the piston 56 is moved by the rod 40 toward the end closure member 22 fluid within the cylinder chamber 85 beneath the piston 56 will have pressure exerted thereupon thereby causing the initial flow of fluid from this chamber 85 to pass through the constantly open orifice 58 in valve 57 into the annular space communicating with the piston passages 80 and then through said passages into the upper cylinder chamber 86, this fluid flow being predeterminedly restricted by the orifice 58. If valve 38 is provided with an orifice, a second constantly restricted flow will be established from chamber 85 through said orifice into the reservoir. When the fluid pressure within the chamber 85 increases so that it cannot be relieved by the flow of fluid in orifice 58 in valve 57 and the orifice in valve 30, if one is provided, then the increased fluid pressure, acting through the orifice 70, will raise the resilient disc 54 to open said orifice 70 which, successively to the orifice 58, establishes another predeterminately restricted fluid flow through passages 67 in the piston, the orifice 70, into the upper cylinder chamber 86. If the fluid pressure within the chamber 85 again raises so that it can not properly be relieved by the coacting orifices 58 and 70, succesively brought into activity by fluid pressure, then the increased pressure will flex the disc valve 55 against the opposing effect of the spring 63 thereby establishing a fluid flow from the chamber 85 through the piston passages 67 past the valve 55 now flexed and establishing the fluid flow into the upper chamber 86 in accordance with the fluid pressure.

Due to the presence of the piston rod 40 in the upper chamber 86 its capacity is less than the fluid displaced from the chamber 85, therefore this differential will cause the fluid pressure within the cylinder chamber 85 to move the pressure relief valve 35 in the lower cylinder end closure member 22 to be moved against the effect of its spring so as to shift the side opening 39 in said relief valve outside the confines of the smaller diameter opening in the intake valve 30 in which said relief valve is slidably supported. This permits an amount of fluid displaced by the piston rod during the downward movement of piston 56 to be restrictively transferred from the cylinder chamber 85 past the relief valve 35 through the intake valve 30 into the fluid reservoir 24.

As a shock absorber is actuated in the opposite direction in response to the separate movements of the members between which the shock absorber is connected, piston 56 will be moved upwardly in the cylinder toward the end closure member 21. Fluid pressure in the upper chamber 86 will force fluid through the piston passages 80, through the predeterminately sized orifice 58 in the valve 57 into the lower chamber 85. This provides the initially restricted fluid flow from chamber 86 to chamber 85 in response to upward movement of the piston. An increase in fluid pressure in the chamber 86 beyond that capable of being relieved by the orifice 58 will flex the valve 57 and its backing plate against the effect of coil spring 76 to establish a restricted flow from the piston passages 80 past the now open valve 57 into the lower chamber 85 of the cylinder. Due to the lesser capacity of chamber 86 fluid discharge from said chamber into the lower chamber 85 will not be sufficient to satisfy its demand for fluid and therefore the intake valve 30 in the lower cylinder end closure member 22 will be raised against the effects of its engaged resilient fingers 31 thereby permitting fluid to flow from the reservoir 26 through the opening in the valve cage or closure 22 past the now open intake valve 30 to provide the necessary fluid for properly filling the cylinder 85 in response to this upward movement of the piston 56.

This present shock absorber therefore provides fluid flow through the piston in either direction initially through the constantly open orifice 58 in the valve 57. As the piston moves downwardly and the flow through the orifice 58 can not properly relieve a predetermined rise in pressure, the resilient disc 54 will be flexed to open orifice 70 and establish a second orifice controlled flow from cylinder chamber 85 through the piston to the cylinder chamber 86. If the two combined orifice controlled flows are not sufficient properly to relieve the fluid pressure then the resilient disc valve 55 will be flexed to establish a restricted fluid flow from chamber 85 to chamber 86. Therefore, the flow from chamber 85 into chamber 86 is controlled by two consecutively acting orifices and one pressure relief valve. Fluid discharged from cylinder chamber 86 into cylinder chamber 85 is first established through the constantly open orifice 58 and if this fluid pressure relief is not sufficient, then the valve 57 will be flexed to establish an additional restricted fluid flow from chamber 86 through the piston into chamber 85. In this instance orifice 70 is rendered ineffective being closed and held closed during the upward movement of the piston by the resilient disc 54 and therefore fluid discharged from chamber 86 to chamber 85 is accomplished first through open orifice 58 and then through the flexed disc valve 57, opened by increasing fluid pressure.

Figure 5:
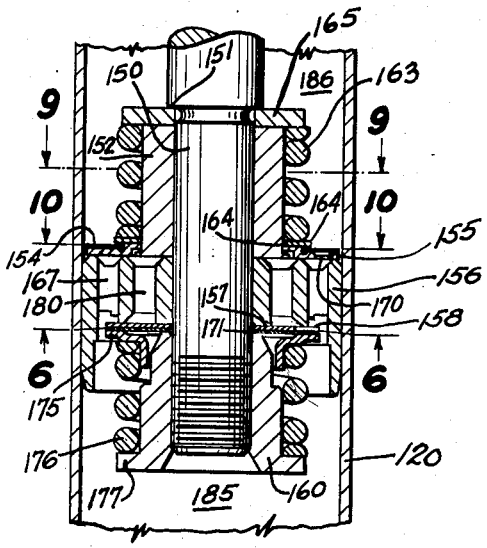
Fig. 5 is a sectional view of a modified form of shock absorber piston embodying the present invention.
Figure 8:
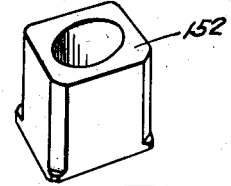
Fig. 8 is a detail view of the space collar on top of the piston in Fig. 5.
Figure 9:
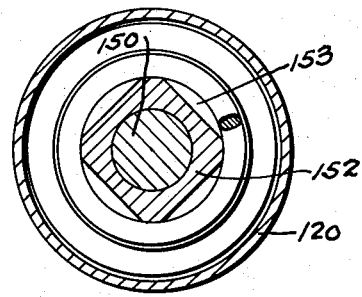
Fig. 9 is a sectional view taken along the line and in the direction of the arrows 9—9 in Fig. 5.
Figure 6:
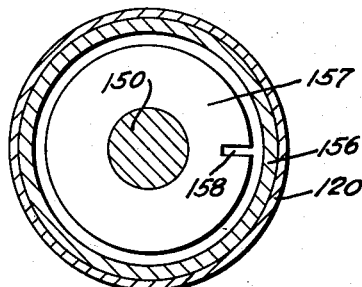
Fig. 6 is a sectional view taken along the line and in the direction of the arrows 6—6 in Fig. 5.
Figure 10:
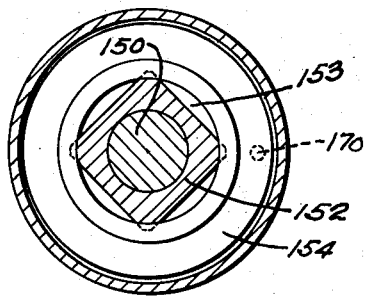
Fig. 10 is a sectional view taken along the line and in the direction of the arrows 10—10 of Fig. 5.
Figure 7:
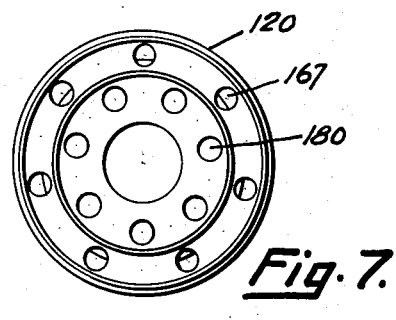
Fig. 7 is a top plan view of the piston shown in Fig. 5.

Fig. 5 shows a modified form of the invention. Here the cylinder 120 contains a reciprocative piston 156 having an outer annular row of passages 167 and an inner annular row of passages 180. The outer row of passages are covered at their upper ends by the disc valve 155 held against the piston by a spring 163 interposed between an abutment collar 164 on said valve and abutment collar 165 fitting about the piston rod portion 150 and engaging a shoulder 151 thereon. A spacer collar 152 surrounding the piston rod portion 150 is rectangular in shape as shown in Figs. 8, 9 and 10 whereby fluid flow spaces 153 are provided between said collar and the spring 163, which communicate with the inner passages 180 in the piston. A check valve 154 in the form of a ring is movably supported on the disc valve 155 and is freely movable thereon until it engages the abutment ring 164 engaged by the spring 163 which thus limits the movement of the check valve 154 from engagement with the disc valve 155 to uncover an orifice 170 in said valve. The corresponding ends of the piston passages 180 in the inner annular row are covered by a resilient disc valve 157, backed by a resilient disc 171 and held against the piston by a clamping nut 160 threaded to the piston rod portion 150. The backing disc 171 is urged upon the disc valve 157 adjacent its outer annular edge by a spring 176 interposed between an abutment ring 175 and a flange 177 on the nut 160. This disc valve 157 has a predeterminately sized orifice 158 which is constantly open and thus permits fluid flow therethrough in either direction in response to reciprocation of the piston.

When the piston 156 of this modified form of construction is moved downwardly in the cylinder 120 fluid pressure in the cylinder chamber 185 will cause fluid to flow through the orifice 158, piston passages 180 and passage openings 153 on the outside of the spacer collar 152 into the upper chamber 186. At the same time fluid pressure will also lift the check valve 170 moving it from engagement with the disc valve 155 to establish an additional fluid flow from chamber 185 through piston passages 167 and the orifice 170 in the valve 155, this flow being predeterminately restricted by said orifice 170. Thus initially as the piston moves downwardly two simultaneously acting orifices will establish restricted flows from the chamber 185 through all of the piston passages into the chamber 186. If these combined orifices controlled flows will not properly relieve the pressure in chamber 185 then valve 155 is moved bodily from engagement with the piston 156 against the effect of spring 163 and thus another restricted fluid flow will be established from chamber 185 into the chamber 186 in accordance with the fluid pressure in chamber 185.

When the piston 156 is moved upwardly in cylinder 120 pressure in the cylinder chamber 186 will urge the check valve 154 upon the disc valve 155 to close the orifice 170 therein. At the same time fluid will be forced from chamber 186 through the passages 153, 180 and the orifice 158 in valve 157 to establish a predeterminately restricted fluid flow from chamber 186 through the piston passage 180 into the chamber 185 in accordance to the fluid pressure in chamber 186. If the orifice 158 can not properly relieve the fluid pressure, valve 157 will be flexed against the opposing effect of spring 176 thereby to establish a restricted flow from chamber 186 through the passages 180 past the valve 157 into the fluid chamber 185. It will of course be understood that due to the fluid displacement of the piston rod 140 the valve in the closure member 22 at the bottom end of cylinder will function in a manner identically with the operation of the valve as described in connection with the shock absorber in Fig. 1.

Thus it will be seen that in this construction as the piston moves downwardly two orifices will act concurrently to establish fluid flow through the piston which if not properly relieved, the fluid pressure beneath the piston will effect operation of the relief valve 155 to establish an additional restricted fluid flow from chamber 185 to chamber 186. As the piston moves upwardly only one orifice 158 becomes effective initially to establish a restricted flow through the piston and, when not properly relieved, fluid pressure in chamber 186 will effect actuation of the valve 157 to establish an additional restricted fluid flow through the piston. In the first instance two orifices act simultaneously followed by pressure relief valve action and in the second instance one orifice acts initially followed by the action of a pressure relief valve.

The present invention provides fluid flow control mechanism for a shock absorber in which fluid flow is initially restricted by orifices to provide proper control for slow or limited movements of the shock absorber, pressure relief valves becoming effective to establish additional restricted fluid flows as the action of the shock absorber becomes more pronounced or moves over long distances at increased speed. This provides proper control of the frame and axle of a vehicle when the vehicle is being operated over a comparatively smooth road and also proper control when the vehicle is being operated over a comparatively more irregular road surface.

It is to be understood that the fixed orifices and the orifices closed by check valves may be reversed in their relationship to the piston rod when desired so that the additional orifice may become effective on the rebound stroke instead of the compression stroke as previously described.

While the embodiment of the present invention as herein disclosed, constitutes a preferred form, it is to be understood that other forms might be adopted.

What is claimed is as follows:

1. In a fluid flow control mechanism for an hydraulic shock absorber having a cylinder and a fluid reservoir in communication with one end of the cylinder; the combination with a reciprocative fluid displacement member in the cylinder, said displacement having passages providing for the transfer of fluid from one side thereof to the other in response to reciprocation thereof; of orificed means yieldably engaging one end of the displacement member and covering certain of said passages; another orificed means yieldably engaging the other end of the displacement member and covering the passages therein not covered by the first mentioned means; and a closure member yieldably engaging one of said means and normally closing the orifice therein.

2. In a fluid flow control mechanism for an hydraulic shock absorber having a cylinder and a fluid reservoir in communication with one end of the cylinder; the combination with a reciprocative fluid displacement member in the cylinder, said displacement member having passages providing for the transfer of fluid from one side thereof to the other in response to reciprocation thereof; of a valve yieldably urged against each end of the fluid displacement member, one valve normally covering certain of the passages in the displacement member, the other valve covering the other of said passages, each valve having an orifice operative to establish a predeterminately restricted fluid flow without movement of the valve relatively to the displacement member; and a check valve on one of said valves, normally closing the orifice in said one valve against fluid flow in one direction.

3. In a fluid flow control mechanism for an hydraulic shock absorber having a cylinder having end closure members, one of said members providing communication between said cylinder and a fluid reservoir; the combination with a piston in said cylinder provided with passages for the transfer of fluid through the piston in either direction; of orificed means yieldably urged against one end of the piston said means being operative variably to control fluid flow through certain of said piston passages in response to movement of the piston in one direction and to provide a predetermined constant control of fluid flow through said certain passages in response to movement of the piston in the opposite direction; orificed means yieldably urged against the other end of the piston, said means being operative variably to control fluid flow through the other of said piston passages in response to movement of the piston in said opposite direction; and a check valve normally yieldably closing the orifice in the means urged against said other end of the piston and preventing fluid flow therethrough as the piston moves in said one direction.

4. In a fluid flow control mechanism for an hydraulic shock absorber having a cylinder and a fluid reservoir; the combination with a piston in said cylinder having passages providing for the transfer of fluid through said piston as it is reciprocated in the cylinder; of an orificed valve yieldably urged upon each end of the piston respectively, one valve covering certain of said piston passages, the second valve covering the other of said passages; and means yieldably closing the orifice of one of said valves whereby as the piston moves in one direction, a fluid flow initially controlled by the orifice of only one valve is established through certain of said piston passages and as the piston moves in the opposite direction the orifices of both valves are successively effective initially to establish a controlled fluid flow through all of the piston passages.

5. In a fluid flow control mechanism for an hydraulic shock absorber having a cylinder and a fluid reservoir; the combination with a piston in said cylinder, provided with passages for the transfer of fluid through the piston in either direction; of fluid flow controlling means for all of said passages said means being operative, as the piston moves in one direction, successively to establish first a constantly restricted fluid flow through certain of said passages, second a constantly restricted fluid flow through the other of said passages and finally a variably restricted fluid flow through said other passages in accordance with increasing fluid pressures, and as the piston moves in the opposite direction is operative first to establish a constantly restricted fluid flow only through said certain piston passages followed by a variably restricted fluid flow in accordance with increasing fluid pressures, the other piston passages being closed during movement of the piston in said opposite direction.

6. In a fluid flow control mechanism for an hydraulic shock absorber having a cylinder and a fluid reservoir; the combination with a piston in said cylinder, said piston having passages for the transfer of fluid through the piston in either direction; a resilient control valve secured at its center to the piston and engaging one end of the piston to cover certain of its passages; resilient means urging the control valve into seating engagement with the piston, the control valve having a predeterminately sized orfice communicating with the piston passages covered by the valve; a resilient check valve secured at its center on the piston and resting upon the outside of the resilient control valve to close the orifice therein; a second resilient control valve secured at its center to the piston, said second valve having a predeterminately sized orifice communicating with the other of said piston passages covered by the valve; and resilient means yieldably urging the second control valve into engagement with the other end of the piston.

7. In a fluid flow control mechanism for an hydraulic shock absorber having a cylinder and a fluid reservoir; the combination with a reciprocative piston in the cylinder; valved passages in the piston operative successively to establish, first a predeterminately constantly restricted fluid flow through certain of said passages, second, and additional predetermined, constantly restricted fluid flow through other of said passages and third, a restricted fluid flow variable in accordance with fluid pressure, through said other piston passages as the piston moves in one direction and first a constantly restricted fluid flow and then a variably restricted flow only through said certain piston passages as the piston moves in the opposite direction.

8. In a fluid flow control mechanism for an hydraulic shock absorber having a cylinder and a fluid reservoir in communication with said cylinder; the combination with a piston in the cylinder provided with passages for the transfer of fluid from one side of the piston to the other as the piston is reciprocated; of fluid flow control mechanism for said piston passages consisting of a separate disc valve yieldably urged against each respective end of the piston, one disc valve covering certain of said passages and having an orifice constantly open, the other disc valve covering the other of said passages not covered by the first disc valve, said other disc valve having an orifice and a resilient check valve on its side opposite the piston, said check valve normally, yieldably closing the orifice in said other disc valve.

9. In a fluid flow control mechanism for an hydraulic shock absorber having a cylinder one end of which communicates with a fluid reservoir, the combination with a fluid displacement member reciprocative in said cylinder, said member having passages providing for the transfer of fluid from one side of the member to the other as it is reciprocated; of a valve normally yieldably closing certain of said passages excepting a constant fluid flow orifice and another valve normally yieldably closing the remaining passages excepting a predetermined orifice, both orifices being successively operative to permit fluid to by-pass the respective valves as the displacement member moves in one direction, and means operative to close one of said orifices for preventing fluid to by-pass said one valve as the piston moves in the other direction.

10. In a fluid flow control mechanism for an hydraulic shock absorber having a cylinder communicating with a fluid reservoir, the combination with a fluid displacement member reciprocative in said cylinder, said member having passages providing for the transfer of fluid from one side of the member to the other as it is reciprocated; of two valves on the displacement member, one normally covering certain of the passages therein, the other the remaining passages therein, both valves being movable by a predetermined fluid pressure to establish a restricted fluid flow in one direction through the passage covered thereby; and an orifice in each valve of lesser fluid flow capacity than the passage covered by the respective valve, both said orifices being operative as the displacement member moves in one direction to permit fluid to by-pass the respective valves, one orifice being inoperative to establish fluid flow past its valve in response to movement of the displacement member in the opposite direction.

11. In a fluid flow control mechanism for an hydraulic shock absorber having a cylinder communicating with a fluid reservoir, the combination with a fluid displacement member reciprocative in said cylinder, said member having passages providing for the transfer of fluid from one side of the member to the other as it is reciprocated; two valves on the displacement member, one normally covering one set of the passages therein, the other the remaining set of passages therein, both valves being movable by a predetermined fluid pressure to establish a restricted fluid flow in one direction through the set of passages covered thereby; and an orifice at the valved end of each set of passages, said orifices being of lesser fluid flow capacity than the passage covered by the respective valve, the one orifice being constantly open and operative to establish a constantly restricted fluid flow through the displacement member as it moves in either direction, the other orifice being normally yieldably closed and operative to establish a constantly restricted fluid flow through the displacment member only when it moves in one direction.

12. In a fluid flow control mechanism for an hydraulic shock absorber having a cylinder communicating with a fluid reservoir, the combination with a fluid displacement member reciprocative in said cylinder, said member having passages providing for the transfer of fluid from one side of the member to the other as it is reciprocated; orificed valves yieldably urged against the displacement member, one valve covering certain of the passages therein, the other valve covering the remaining passages, said orificed valves each being operative to establish a constantly restricted fluid flow through the displacement member as it moves in one direction, said valves being respectively movable by predetermined increase in fluid pressure in response to movement of the displacement member in one direction or the other, to uncover the passages normally covered by them; and means yieldably urged upon one of said valves normally to close the orifice therein, whereby the passages covered thereby are completely and constantly closed against fluid flow therethrough as the displacement member moves in the other direction.

MEARICK FUNKHOUSER.
GEORGE A. BRUNDRETT.

References Cited in the file of this patent

UNITED STATES PATENTS

| Number | Name | Date |
| --- | --- | --- |
| 2,159,289 | Nickelsen | May 23, 1939 |
| 2,191,636 | Walker | Feb. 27, 1940 |
| 2,327,295 | Whisler, Jr. | Aug. 17, 1943 |
| 2,456,736 | Rossman | Dec. 21, 1948 |